US012147712B2

(12) United States Patent
Sankaranarayanan

(10) Patent No.: US 12,147,712 B2
(45) Date of Patent: *Nov. 19, 2024

(54) MEMORY PERFORMANCE USING MEMORY ACCESS COMMAND QUEUES IN MEMORY DEVICES

(71) Applicant: Micron Technology, Inc., Boise, ID (US)

(72) Inventor: Sundararajan N. Sankaranarayanan, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,727

(22) Filed: Dec. 8, 2023

(65) Prior Publication Data

US 2024/0103770 A1 Mar. 28, 2024

Related U.S. Application Data

(63) Continuation of application No. 17/411,572, filed on Aug. 25, 2021, now Pat. No. 11,868,655.

(51) Int. Cl.
*G06F 3/06* (2006.01)
(52) U.S. Cl.
CPC .......... *G06F 3/0659* (2013.01); *G06F 3/0622* (2013.01); *G06F 3/0679* (2013.01)
(58) Field of Classification Search
CPC ..... G06F 3/0659; G06F 3/0622; G06F 3/0679
See application file for complete search history.

(56) References Cited

U.S. PATENT DOCUMENTS

| 8,499,293 B1 | 7/2013 | Ashcraft et al. |
| 2008/0077727 A1 | 3/2008 | Baca et al. |
| 2014/0068159 A1 | 3/2014 | Yi et al. |
| 2014/0143519 A1 | 5/2014 | Heidelberger et al. |
| 2016/0162186 A1* | 6/2016 | Kashyap ............... G06F 3/0688 711/103 |
| 2018/0113803 A1 | 4/2018 | Kim et al. |
| 2019/0087128 A1 | 3/2019 | Shin |

(Continued)

OTHER PUBLICATIONS

Tavakkol, Arash, et al. "{MQSim}: A framework for enabling realistic studies of modern {Multi-Queue}{SSD} devices." 16th USENIX Conference on File and Storage Technologies (FAST 18). 2018. (Year: 2018).*

(Continued)

*Primary Examiner* — Nicholas J Simonetti
(74) *Attorney, Agent, or Firm* — LOWENSTEIN SANDLER LLP

(57) ABSTRACT

Systems and methods are disclosed including a controller and a memory device comprising a first plane and a second plane where each plane is associated with a respective queue maintained by the controller. The local media controller is configured to perform operations comprising storing, in a first queue associated with the first plane, a first plurality of memory access commands; storing, in a second queue associated with the second plane, a second plurality of memory access commands; and processing the first plurality of memory access commands from the first queue and the second plurality of memory access commands from the second queue.

19 Claims, 5 Drawing Sheets

(56) References Cited

U.S. PATENT DOCUMENTS

| | | |
|---|---|---|
| 2019/0227749 A1 | 7/2019 | Wakchaure et al. |
| 2019/0265911 A1 | 8/2019 | Yoo et al. |
| 2019/0278705 A1 | 9/2019 | Park |
| 2019/0377675 A1 | 12/2019 | Vali et al. |
| 2020/0026466 A1* | 1/2020 | Takano .................. G06F 3/061 |
| 2020/0209944 A1 | 7/2020 | Palmer |
| 2020/0393994 A1 | 12/2020 | Subbarao et al. |
| 2022/0043600 A1 | 2/2022 | Moon |
| 2022/0083266 A1 | 3/2022 | Prakash et al. |
| 2023/0050592 A1 | 2/2023 | Zhang et al. |

OTHER PUBLICATIONS

International Search Report and Written Opinion for Application No. PCT/US2022/041401, mailed on Dec. 2, 2022, 10 pages.
Park, S.Y., et al., "Exploiting Internal Parallelism of Flash-Based SSDs," IEEE Computer Architecture Letters, 2010, vol. 9(1), 4 Pages.

\* cited by examiner

MEMORY PERFORMANCE USING MEMORY ACCESS COMMAND QUEUES IN MEMORY DEVICES

RELATED APPLICATION

This application a continuation of U.S. patent application Ser. No. 17/411,572, filed Aug. 25, 2021, the entire contents of which is hereby incorporated by reference herein.

TECHNICAL FIELD

Embodiments of the disclosure generally relate to memory sub-systems, and more specifically, relate to improved memory performance using memory access command queues in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
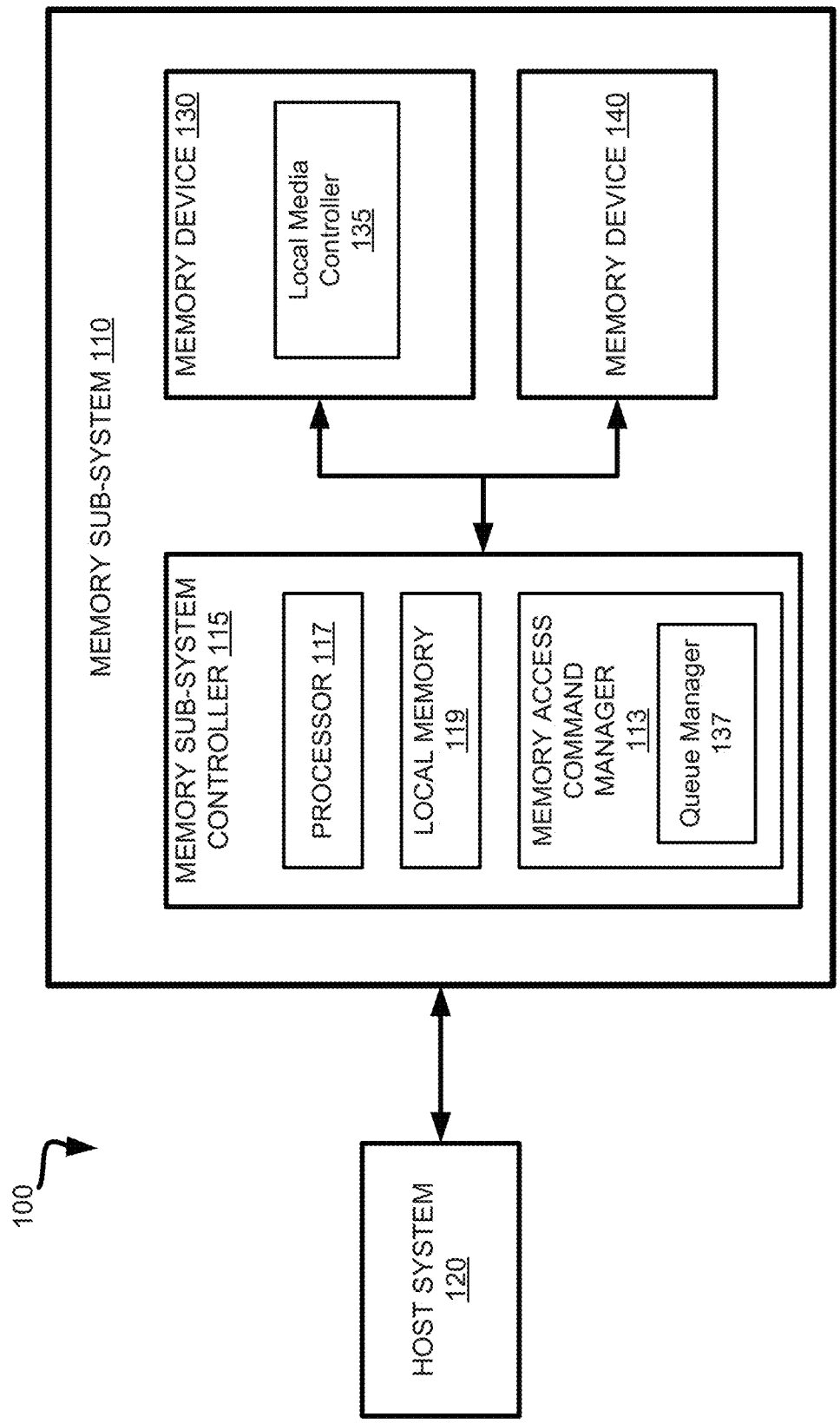
FIG. 1 illustrates an example computing system that includes a memory sub-system in accordance with some embodiments of the present disclosure.

Aspects of the present disclosure are directed to improved memory performance using memory access command queues in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Memory access operations can be performed by the memory sub-system. The memory access operations can be host-initiated operations or memory sub-system controller initialed. For example, the host system can initiate a memory access operation (e.g., write operation, read operation, erase operation, etc.) on a memory sub-system. The host system can send memory access commands (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

In some memory sub-systems, a local media controller of the memory device communicates with a die or a set of dies via a single communication channel, such as an Open NAND Flash Interface (ONFI) channel. In particular, the local media controller can issue a read commands, write commands, and erase commands to the set of dies over the communication channel. In the case of read commands, the local media controller can receive requested data from a die over the communication channel. Generally, a die can only cache one single-plane memory access operation (or two operations for a multi-plane memory access operation) at a time. As such, for plane-level read commands, the die cannot receive and queue additional memory access operations until the pending memory access operation is processed. For example, in response to receiving a read command from the local media controller, a die of the memory device can queue the read command, process the read command by retrieving the data desired by the read command, and then attempt send the retrieved data to the local media controller. However, if the communication channel is busy (e.g., the local media controller is communicating with other dies of the set), the die cannot clock out the retrieved data until the communication channel is free. As such, the die remains in an idle state while waiting, which leads to decreased efficiency of the memory device.

Aspects of the present disclosure address the above and other deficiencies by implementing command queues in memory devices. Each die of the memory device can include two or more planes where each plane includes a set of physical blocks. Each die can be structured to include a per-plane command queue maintained by a local media controller. The plane command queues can be used to track and store multiple memory access command entries (e.g., one or more read commands, write commands, or any combination thereof) for each plane of a die. The die can process the memory access command entries in the order received (e.g., first in, first out, "FIFO"), based on the priority of the entries, or based on other processing schemes. For example, some memory access operations can be prioritized over other memory access operations. In some embodiments, the die can differentiate between high priority memory access commands and low priority memory access commands. For example, a memory access command with a higher priority can be processed out of the plane command queue prior to a memory access command with a lower priority, even though the lower priority memory access command was received by the die prior to the higher priority memory access command. In some embodiments, memory access commands issued by the host system can be characterized as high priority memory access commands, and memory access commands issued by the memory sub-system controller to manage media or background activities can be characterized as low priority memory access commands.

In some embodiments, memory access command entries can be inserted into the plane command queue in parallel to memory access commands from the plane command queue being processed, without one process affecting the other. For example, a write command from a plane command queue can be processed while received read command is inserted into the plane command queue.

Advantages of the present disclosure include, but are not limited to, an improved performance of the memory device and/or an improved quality of service for the host system. For example, the multiple memory access operations can be queued on each die of a memory device. This allows each die to process multiple memory access operations when the communication channel is busy. Thus, embodiments of the present disclosure reduce the amount of time a die will idle when a communication channel is busy, which reduces latency and improves performance of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a memory access command manager 113 that can issue memory access commands to memory device 130. In some embodiments, the memory sub-system controller 115 includes at least a portion of the memory management component 113. In some embodiments, the memory access command manager 113 is part of the host system 110, an application, or an operating system. In other embodiments, local media controller 135 includes at least a portion of memory access command manager 113 and is configured to perform the functionality described herein.

The memory access command manger 113 can maintain a memory access command data structure ("controller command data structure") to track memory access commands received from the memory sub-system controller 115 and/or the host 120. The controller command data structure can include a per-die command queue for each die of memory device 130, a per-plane command queue for each plane of each die of memory device 130, a per-die-set queue for one or more sets of dies of memory device 130, or any combination thereof. For example, each command queue can store pending memory access commands (host system 120 memory access commands and memory sub-system controller 115 memory access commands) issued to a corresponding plane of memory device 130 and/or memory device 140. The memory access command manager 113 can determine into which command queue to insert a received memory access command by determining which physical address or address range access is requested by the memory access command.

The memory access command manager 113 can attach a unique identifier to each memory access command. The unique identifier can allow the memory sub-system controller 115 to track the memory access command. The memory access command manager 113 can send a queued memory access command to the memory device 130 and/or memory device 140. In response to a memory access command being processed (e.g., read data received from memory device 130 and/or memory device 140 and sent to host 120, data written to memory device 130 and/or memory device 140, etc.), the memory access command manager 113 can evict the corresponding memory access command from the controller command data structure.

In some embodiments, the memory access command manager 113 can process the memory access commands in the order received (e.g., FIFO). By implementing the FIFO structure, the memory access command manager 113 can prevent issues related to data dependencies. Data dependency is a situation in which a memory access command refers to data being operated on by a preceding memory access command. For example, the memory access command manager can receive a write command for data stored at a physical address on memory device 130, followed by a read command for the data from the same physical address. If the read command is performed prior to the write command, the read command will return incorrect data to the host system 120, as the write command has not yet been processed.

In some embodiments, the memory access command manager 113 can maintain and manage two or more controller command data structures. Each of the two or more controller command data structures can include independent per-plane command queues for the same set of dies of the memory device 130 or for different sets dies of memory device 130. For example, in some embodiments, the memory access command manager 113 can maintain and manage a high priority data structure and a low priority data structure to prioritize one some memory access commands over other memory access commands (of a lower priority level). A high priority memory access command can be processed (e.g., sent to memory device 130 and/or memory device 140) by the memory access command manager 113 prior to a low priority memory access command, even though the low priority memory access command was received by the memory access command manager 113 prior to the high priority memory access command. High priority memory access commands can be memory access commands issued by the host system 120, while low priority memory access commands can be memory access commands issued by the memory sub-system controller (e.g., memory access commands relating to maintenance operations, such as garbage collection, wear leveling, bad block management, block refresh operations, etc.). High priority memory access commands and low priority memory access commands are used as exemplary examples. Each memory access command can include a priority identifier (e.g., a high priority identifier, a low priority identifier, etc.). A priority identifier can indicate whether to store a received memory access command in the high priority data structure or the low priority data structure.

In some embodiments, the memory access command manager 113 can use a traffic arbiter to regulate between sending, to the memory device 130 and/or 140, high priory memory access commands from the high priority data structure and low priority memory access commands from the low priority data structure. In some embodiments, the memory access command manager 113 can implement a ratio scheme to regulate between sending a certain amount of high priority memory access commands against a certain amount of low priority memory access commands. For example, for every five memory access commands, the memory access command manager 113 can send four high priority memory access commands, and one low priority memory access command (an 80% ratio). The ratio can be predetermined during manufacturing and/or calibration of the memory sub-system 110, or defined by a user of the memory sub-system 110. In some embodiments, the ratio scheme may be initiated based on a predetermined condition. For example, the memory access command manager 113 can sample the high priority data structure and the low priority data structure to determine the amount of high priory memory access commands in the high priority data structure and the amount of low priority memory access commands in the low priority data structure. In response to a criterion being satisfied, the memory access command manager 113 can enable or disable the ratio scheme. The criterion can include the ratio of high priority commands against low priority memory access commands exceeding a threshold value, the amount of high priority memory access commands in the high priority data structure exceeding a threshold value, the amount of low priority memory access commands in the low priority data structure exceeding a threshold value, or any combination thereof.

The memory sub-system 110 further includes a queue manager 137 that can manage memory access command queues for memory device 130. In some embodiments, the queue manager 137 is part of the memory access command manager 113 and/or memory sub-system controller 115. In some embodiments, at least a portion of the queue manager 137 is part of the host system 120, an application, or an operating system. In other embodiments, local media controller 135 includes at least a portion of queue manager 137 and is configured to perform the functionality described herein.

The queue manger 137 can manage one or more sets of command queues for each die of memory device 130, or for each plane of each die of the memory device 130. Like the memory access command manager 113, the queue manger 137 can maintain a memory access command data structure (hereafter "memory device command data structure") to track outstanding memory access commands received from the memory sub-system controller 115. The memory device command data structure can include a per-plane command queue for each die of memory device 130, a per-die command queue, or any combination thereof. Each command queue can store pending memory access commands issued to a corresponding plane of memory device 130. The queue manger 137 can determine into which command queue to insert a memory access command, received from memory access command manager 113, by determining which physical address or address range access is requested by the memory access command. For example, a host command can provide a logical address, which is translated by memory sub-system controller 115, into a physical address. The physical address can include the identified die, plane, etc. By way of illustrative example, memory device 130 may include 16 die, with each die including four planes. Accordingly, queue manager 137 can use the memory device command data structure to manage memory access commands for the 64 planes (4 plane per die×16 die=64 planes).

Each plane can include its own memory access command queue (hereafter "plane queue") capable of storing at least one memory access command. For example, each plane queue can include a single entry to store one memory access command, two entries to store two memory access commands, or more than two entries to store a corresponding amount of memory access commands. Each plane queue is processed autonomously by the die (e.g., without input from the queue manager 137). For example, in response to processing a one of two pending memory access commands in a plane queue, the die can process the second pending memory access command without instructions from the queue manager 137.

The queue manager 137 can receive, from memory access command manager 113, a memory access command, determine a physical address referenced by the memory access command, and insert the memory access command into the appropriate command queue in the memory device command data structure. The queue manager 137 can further translate the memory access command into a set of die and channel operations and send the memory access command to the appropriate die on the memory device 130 to be inserted into the proper plane queue.

In some embodiments, the queue manager 137 can send memory access commands to, and receive data from, the dies using one or more communication channels. A communication channel can include, for example, an Open NAND Flash Interface ONFI channel, or any other channel capable of enabling communication between the queue manager 137 and the dies. In some embodiments, multiple communication channels can be used, where each communication channel connects to a particular set of dies. For example, memory device 130 can include two sets of dies, a first set include dies 0, 2, 4, and 6, and a second set includes dies 1, 3, 5, and 7. Queue manager 137 can communicate to the first set of dies using one communication channel, and to the second set using another communication channel.

Queue manager 137 can process memory access commands from the memory device memory access command structure using one or more schemes. In some embodiments, queue manager 137 can process the memory access commands using a round-robin scheme, where queue manager 137 cycles sending a memory access command to each die, or to each die of a set. For example, regarding the first set of dies, queue manager 137 can send a memory access command to die 0, then die 2, then die 4, then die 6, then die 0 again, and so forth. In some embodiments, queue manager 137 can include a cycle to send memory access commands, followed by a cycle to listen for data from the die set (e.g., for data from a read command). In some embodiments, queue manager 137 can send memory access commands over multiple communication channels in parallel.

In some embodiments, each die can perform memory access command set-up operations (e.g., receiving memory access commands from the queue manager 137 and inserting the memory access commands into the appropriate plane queue of the memory device command data structure) and data transfer operations (e.g., processing memory access commands from the plane queue) simultaneously. In particular, the queue manager 137 can insert a new memory access command into a plane queue while the plane queue is processing a pending memory access command. In an illustrative example, a plane queue of a die can include a pending command. While processing the pending memory access command, the die can receive a new memory access command from queue manger 137. The die can insert the new memory access command into the plane queue without interrupting the execution of the pending memory access command. In some embodiments, the die can receive and insert the new memory access commands into the command queue as long as the communication channel to the memory sub-system controller 115 is free, and plane queue has at least one empty entry available to record the new memory access command.

In some embodiments, a single memory access command can include a memory address range spanning multiple planes of a die (hereafter "multi-plane memory access command"). In response to receiving a multi-plane memory access command, the queue manager 137 can insert the multi-plane memory access command into two or more plane queues corresponding to the address range of the multi-plane memory access command. For example, in response to receiving a read command including an address range located in an address space of a plane 1 and plane 2, the queue manager 137 can insert the read command into the plane queue of plane 1 and into the plane queue of plane 2. Regarding multi-plane read commands, each plane can return partial data requested by the read command. In response, the queue manager 137 can perform an assembly operation to merge the partial data retrieved from each plane. Regarding multi-plane write commands, the queue manager 137 can split a write command into multiple write commands, each including a portion of the data of the write command. Each of the multiple write commands can be inserted into the appropriate plane queue.

In some embodiments, the queue manager 137 can implement a set of rules regarding multi-plane memory access commands. In some embodiments, the queue manager 137 can send multi-plane memory access commands to a die only when the plane queues of the corresponding planes addressed by the multi-plane memory access command are empty (e.g., the plane queues have no pending memory access commands or data to clock out). In some embodiments, the queue manager 137 can insert only single-plane memory access commands into a plane queue when the plane queue includes a multi-plane command. In some embodiments, the queue manager 137 can insert only high priority memory access commands into a plane queue with a pending memory access command.

In some embodiments, the queue manager 137 and/or the processing unit of a die can suspend processing a command operation. For example, the queue manager 137 and/or the processing unit of the die can suspend writing data to one or more blocks, reading data from one or more blocks, erasing data from one or more blocks, etc. In some embodiments, the queue manager 137 and/or the processing unit of the die can include limits on how many memory access commands can be suspended per die and/or per plane. For example, during the operation of die 0 sending data, from a low priority memory access command to queue manager 137, the operation can be suspended to send a high priority memory access command from die 2 to the queue manager 137 over the communication channel. Once the high priority memory access command is sent, processing unit of the die can resume the original command operation by sending the data from die 0 to the queue manager 137.

In some embodiments, the processing unit of the die (e.g., local media controller 135) can evict a memory access command positioned in a plane queue. For example, a plane queue can store a write command that is addressed to a specific address space. The die can then insert a new write command, into the plane queue, that is addressed to the same address space as the earlier received write command in the plane queue. Accordingly, the die can evict the earlier received write command.

In some embodiments, the processing unit of a die can prioritize execution of one or more data access commands in a plane queue based on the priority of the data access command. For example, the queue manager 137 can first insert a low priority read command into a plane queue, followed by a high priority read command into the plane queue. The processing unit of the die can identify the priorities of each read command and execute the high priority read command prior to executing the low priority read command.

In some embodiments, the processing unit of the die can send data from multiple read commands in an order different than the order read commands were received in. In some embodiments, the die can clock out the data based on priority level. For example, a die can receive two read command data. The die can insert the read commands into the appropriate plane queue. The read command can be inserted into the same plane queue, or into different plane queues. The die can process the earlier received read command (having a low priority), but be unable to clock out the data pertaining to the read command because the communication channel is busy. The die can then process the later received read command (having a high priority). In response to the communication channel becoming free, the die can clock out the data of the later received read command first due to the later received read command having a higher priority than the earlier received read command. Further details with regards to the operations of the plane queues and queue manager 137 are described below.

Figure 2:
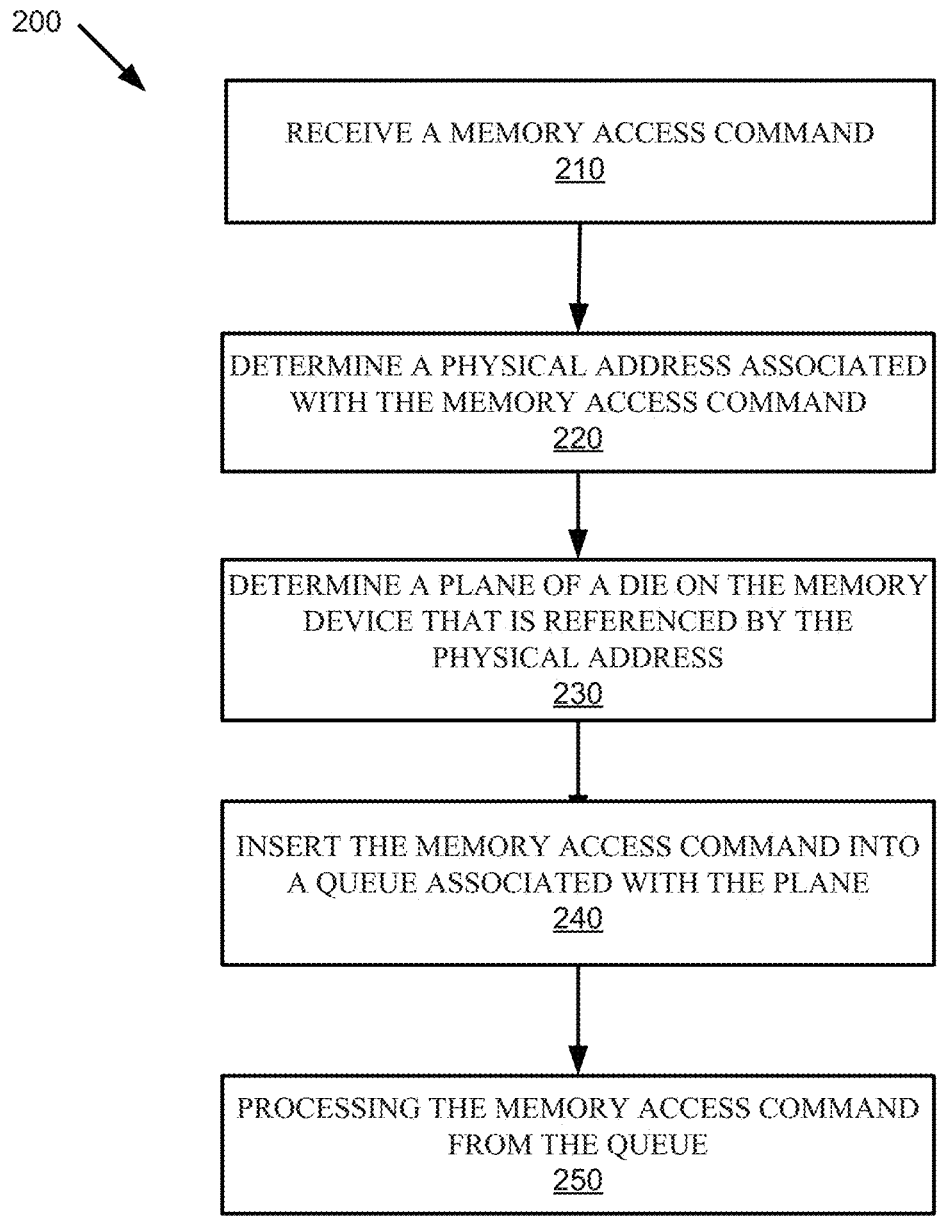
FIG. 2 is a flow diagram of an example method for utilizing memory access command queues, in accordance with some embodiments of the present disclosure.

FIG. 2 is a flow diagram of an example method 200 illustrating processes performed to utilize memory access command queues, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the queue manager 137 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic can receive a memory access command. For example, the processing logic can receive a write command, a read command, an erase command, etc. The memory access command can be host initiated or memory sub-system controller initiated. In some embodiments, the memory access command can include a unique identifier to allow the memory sub-system controller 115 to track the memory access command. In some embodiments, the memory access command can include a priority identifier (e.g., a high priority identifier, a low priority identifier, etc.)

At operation 220, the processing logic can determine a physical address associated with the memory access command. In embodiments, the physical address can be located in an address space of a single plane. In some embodiments, the physical address can be located in an address space of multiple planes on a die.

At operation 230, the processing logic can determine a plane of a die on the memory device that is reference by the physical address. For example, the processing logic can use a table to determine which plane of which die includes the address space.

At operation 240, the processing logic can insert the memory access command into a queue associated with the plane. In some embodiments, the queue can store two or more memory access commands.

At operation 250, the processing logic can process the memory access command from the queue. In one example, in response to the memory access command being a write command, the processing logic can write the data of the write command to the address space on the plane. In another example, in response to the memory access command being a read command, the processing logic can retrieve the data of the write command to the address space on the plane, and send the retrieved data to the memory sub-system controller.

Figure 3:
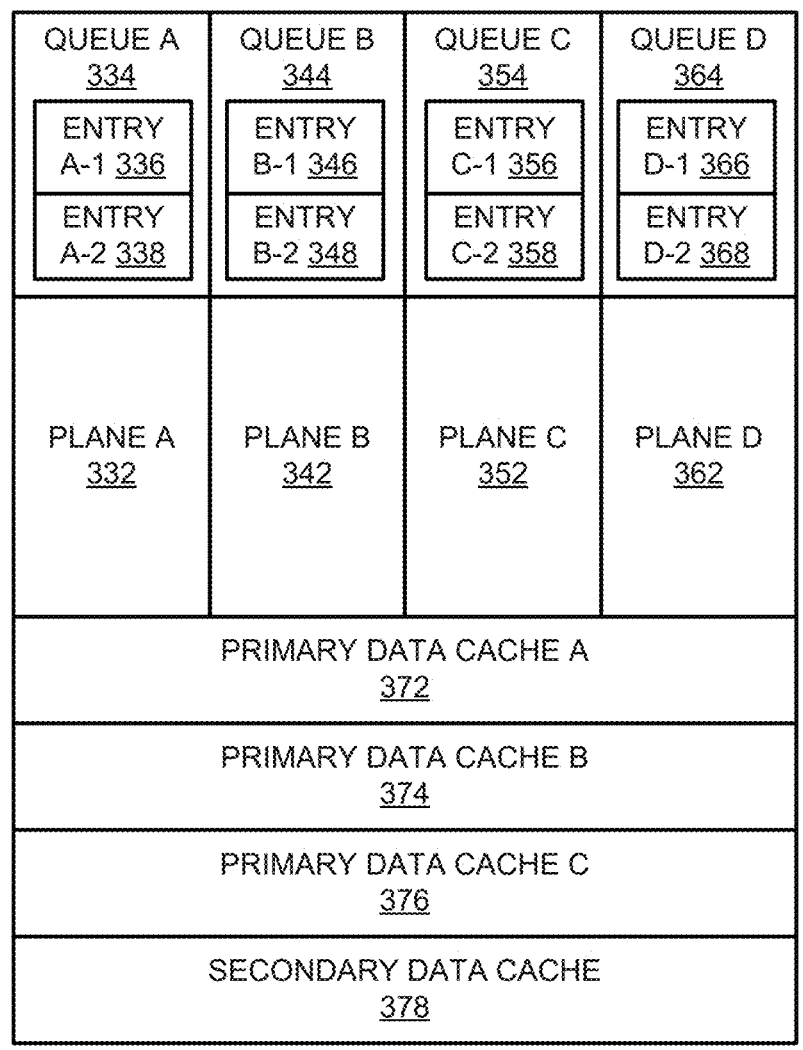
FIG. 3 illustrates a die structured with four plane queues, in accordance with some embodiments of the present disclosure.

FIG. 3 is an illustration of a die 300 structured with four plane queues, in accordance with some embodiments of the disclosure. In some embodiments, die 310 can include plane A 332, plane B 342, plane C 352, and plane D 362. Each of the planes can include a plane queue. As shown, plane A 332 includes queue A 334, plane B 342 include plane B 344, plane C 352 include queue C 354, and plane D 362 include queue D 364. Each plane queue include two entries into which memory access commands can be inserted for processing. As shown, plane A 334 includes entry A-1 336 and entry A-2 338, plane B 344 includes entry B-1 346 and entry B-2 348, plane C 354 includes entry C-1 356 and entry C-2 358, and plane D 364 includes entry D-1 366 and entry D-2 368. Primary data cache A 372, primary data cache B 374, primary data cache C 376, and secondary data cache D 378 can each include one or more registers for moving data from between the queues and the blocks of the planes.

Figure 4:
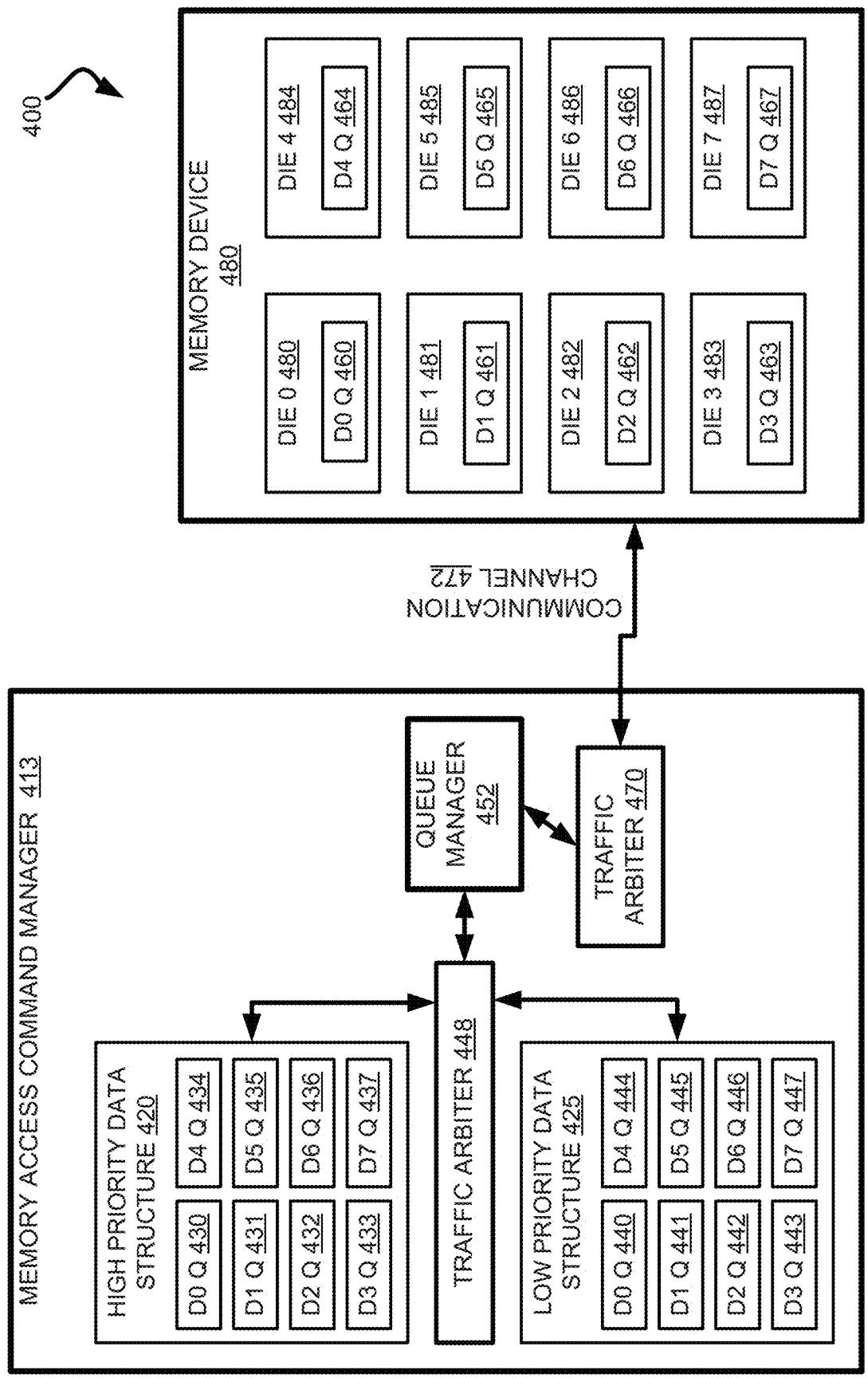
FIG. 4 illustrates an example computing system that includes a memory access command manager and memory device, in accordance with some embodiments of the present disclosure.

FIG. 4 illustrates an example computing system 400 that includes a memory access command manager 413, and memory device 480, in accordance with some embodiments of the present disclosure. Memory device 480 can include eight die (die-0 480, die-1 481, die-2 482, die-3 483, die-4 484, die-5 485, die-6 486, die-7 487). Each die can include two or more planes. Each die can include a corresponding set of plane queues (e.g., die-0 queues 460, die-1 queues 461, die-2 queues 462, die-3 queues 463, die-4 queues 464, die-5 queues 465, die-6 queues 466, die-7 queues 467). Each plane queue can store pending memory access commands issued by memory access command manager 413 to a plane of a corresponding die of memory device 480. Each plane queue include at least two entries into which memory access commands can be inserted for processing.

The computing system 400 can further include a host system (not shown) that is capable of communication with the memory access command manager 413. The host system (e.g., host system 120) can send memory access commands to memory access command manager 413.

Memory access command manager 413 can be similar to memory access command manager 113. Memory access command manager 413 can include high priority data structure 420, low priority data structure 425, and queue manager 452, traffic arbiter 448, and traffic arbiter 470. High priority data structure 420 can be structured to store high priority commands for each die of memory 475. As shown, high priority data structure 420 includes eight command queues, one for each die of memory device 480 (e.g., die-0 queue 430, die-1 queue 431, die-2 queue 432, die-3 queue 433, die-4 queue 434, die-5 queue 435, die-6 queue 436, die-7 queue 437). Low priority data structure 425 also includes eight command queues, one for each die of memory device 480 (e.g., die-0 queue 440, die-1 queue 441, die-2 queue 442, die-3 queue 443, die-4 queue 444, die-5 queue 445, die-6 queue 446, die-7 queue 447). Each memory access command can include a priority identifier (e.g., a high priority identifier, a low priority identifier, etc.) to indicate whether to store a received memory access command in the high priority data structure 420 or the low priority data structure 425. Traffic arbiter 448 can regulate between sending, to the queue manager 452, high priory memory access commands from the high priority data structure 420 and low priority memory access commands from the low priority data structure 425. For example, the traffic arbiter 448 can implement a ratio scheme to regulate between sending a certain amount of high priority commands against a certain amount of low priority memory access commands.

The queue manger 452 can manage a memory device memory access command structure (not shown) to track outstanding memory access commands received from traffic arbiter 448. Traffic arbiter 470 can process memory access commands from the memory device memory access command structure using one or more schemes. In some embodiments, traffic arbiter 470 can process the memory access commands using a round-robin scheme, where traffic arbiter 470 cycles sending a memory access command to each die, or to each die of a set. For example, regarding the first set of dies, traffic arbiter 470 can send a memory access command to die-0 480, then die-2 482, then die-4 484, then die-6 486, then die-0 again, and so forth. In some embodiments, traffic arbiter 470 can include a cycle to send memory access commands, followed by a cycle to listen for data from the die set (e.g., for data from a read command). A processing device of memory 475 can insert each memory access command into a proper plane queue for the appropriate die.

In some embodiments, traffic arbiter 470 can send memory access commands to, and receive data from, the dies of memory device 480 using communication channel 472. In some embodiments, multiple communication channels can be used, where each communication channel connects to a particular set of dies. For example, a first set of dies include die-0 480, die-2 482, die-4 484, and die-6 486, and a second set of dies includes die-1 481, die-3 483, die-5 485, and die-7 487. Traffic arbiter 470 can communicate to the first set of dies using one communication channel, and to the second set using another communication channel.

Figure 5:
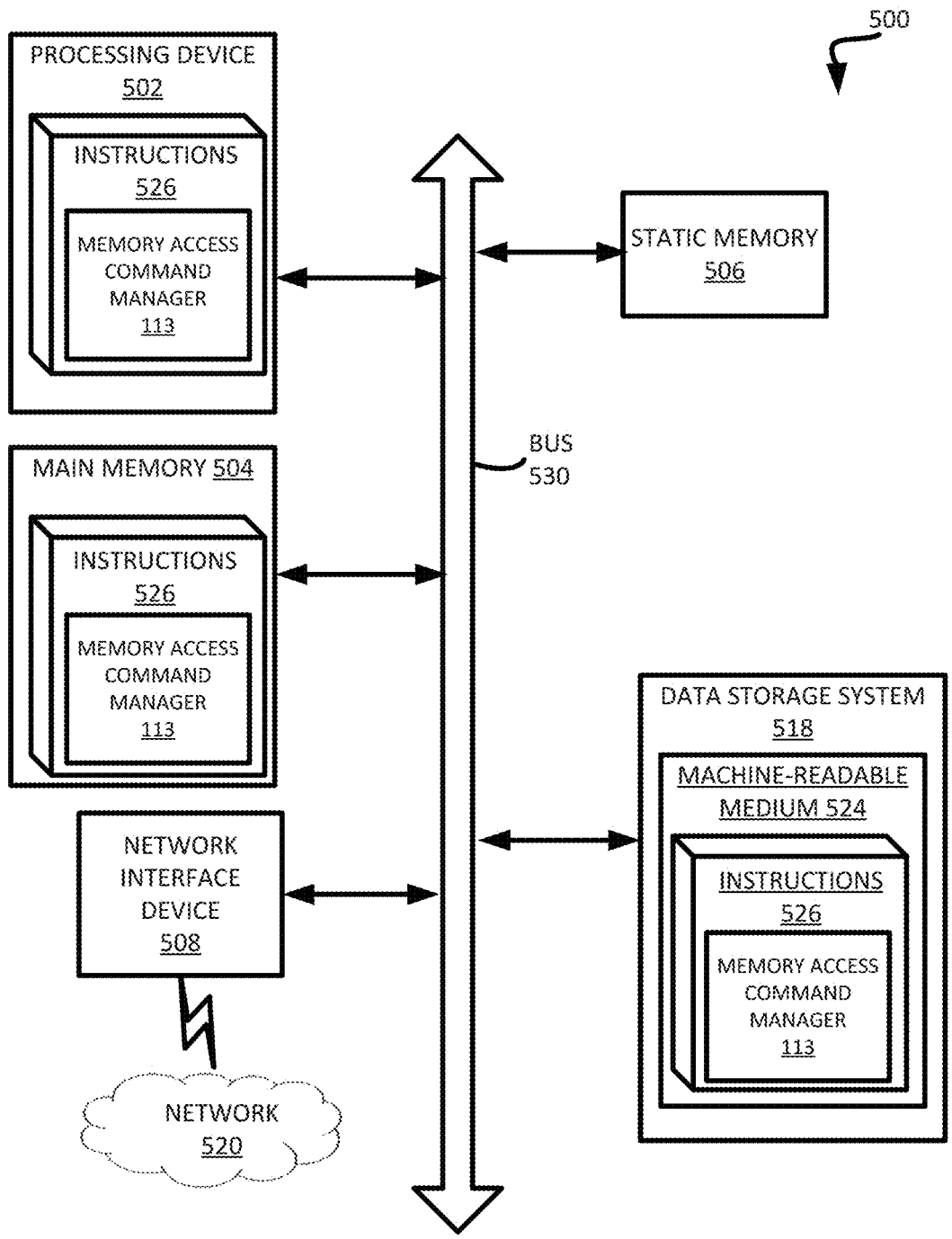
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to memory access command manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530. Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to memory access command manager 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a controller; and
   a memory device comprising a first plane and a second plane, each plane associated with a respective queue maintained by a respective local media controller of the memory device, wherein the controller is configured to perform operations comprising:
   storing, in a first queue associated with the first plane, a first plurality of memory access commands;
   storing, in a second queue associated with the second plane, a second plurality of memory access commands; and
   processing the first plurality of memory access commands from the first queue and the second plurality of memory access commands from the second queue.

2. The system of claim 1, wherein each memory access command of the first plurality of memory access commands are associated with a priority and are received, by the respective local media controller, based on each respective priority.

3. The system of claim 1, wherein each memory access command of the first plurality of memory access commands that is received by the respective local media controller is evicted from a controller command data structure.

4. The system of claim 1, wherein the operations further comprise:
   processing a memory access command from the first queue, wherein a further memory access command was inserted into the first queue after the memory access command was inserted into the first queue; and
   sending data associated with the further memory access command prior to sending data associated with the memory access command.

5. The system of claim 1, wherein the operations further comprise:
   suspending processing a memory access command from the first queue;
   processing a further memory access command from the first queue; and
   resuming processing the memory access command from the first queue.

6. The system of claim 1, wherein the operations further comprise:

receiving a memory access command from at least one of a high priority data structure or a low priority data structure.

7. The system of claim 6, wherein the memory access command is received based on a scheme that regulates between sending a first amount of high priority commands against a second amount of low priority memory access command.

8. A method comprising:

storing, by a controller operatively coupled to a memory device, in a first queue associated with a first plane of the memory device, a first plurality of memory access commands;

storing, by the controller, in a second queue associated with a second plane of the memory device, a second plurality of memory access commands; and processing the first plurality of memory access commands from the first queue and the second plurality of memory access commands from the second queue, wherein the first queue and the second queue are located on the memory device and maintained by a respective local media controller located on the memory device.

9. The method of claim 8, wherein each memory access command of the first plurality of memory access commands are associated with a priority and are received, by the respective local media controller, based on each respective priority.

10. The method of claim 8, wherein each memory access command of the first plurality of memory access commands that is received by the respective local media controller is evicted from a controller command data structure.

11. The method of claim 8, further comprising:

processing a memory access command from the first queue, wherein a further memory access command was inserted into the first queue after the memory access command was inserted into the first queue; and sending data associated with the further memory access command prior to sending data associated with the memory access command.

12. The method of claim 8, further comprising:

suspending processing a memory access command from the first queue;

processing a further memory access command from the first queue; and resuming processing the memory access command from the first queue.

13. The method of claim 12, wherein the memory access command is received based on a scheme that regulates between sending a first amount of high priority commands against a second amount of low priority memory access command.

14. A non-transitory computer-readable storage medium comprising instructions that, when executed by a processing device operatively coupled to a memory device, performs operations comprising:

storing, by the processing device, in a first queue associated with a first plane of the memory device, a first plurality of memory access commands;

storing, the processing device, in a second queue associated with a second plane of the memory device, a second plurality of memory access commands; and processing the first plurality of memory access commands from the first queue and the second plurality of memory access commands from the second queue, wherein the first queue and the second queue are located on the memory device and maintained by a respective local media controller located on the memory device.

15. The non-transitory computer-readable storage medium of claim 14, wherein each memory access command of the first plurality of memory access commands are associated with a priority and are received, by the respective local media controller, based on each respective priority.

16. The non-transitory computer-readable storage medium of claim 14, wherein each memory access command of the first plurality of memory access commands that is received by the respective local media controller is evicted from a controller command data structure.

17. The non-transitory computer-readable storage medium of claim 14, wherein the operations further comprise:

processing a memory access command from the first queue, wherein a further memory access command was inserted into the first queue after the memory access command was inserted into the first queue; and sending data associated with the further memory access command prior to sending data associated with the memory access command.

18. The non-transitory computer-readable storage medium of claim 14, wherein the operations further comprise:

suspending processing a memory access command from the first queue;

processing a further memory access command from the first queue; and resuming processing the memory access command from the first queue.

19. The non-transitory computer-readable storage medium of claim 14, wherein the processing device to perform further operations comprising:

receiving a memory access command from at least one of a high priority data structure or a low priority data structure, wherein each data structure comprises at least one of a per-die command queue for each die of the memory device, a per-plane command queue for each plane of each die of the memory device, or a per-die-set queue for one or more sets of dies of the memory device.

* * * * *